May 29, 1956 G SCHAMING 2,747,266
METHOD OF COLD WORKING BLOCKS BETWEEN DIES
Filed Jan. 7, 1953

INVENTOR.
Guillaume Schaming
BY
Churchill, Rich, Weymouth & Engel
Attorneys

United States Patent Office 2,747,266
Patented May 29, 1956

2,747,266

METHOD OF COLD WORKING BLOCKS BETWEEN DIES

Guillaume Schaming, Richmond (Surrey), England, assignor to Societe Schostal, Vaduz, Liechtenstein, a joint-stock company Application January 7, 1953, Serial No. 330,103

Claims priority, application France July 18, 1952

4 Claims. (Cl. 29—417)

The present invention relates to the cold stamping of any material lending itself to such type of work, metallic or otherwise. Blocks of uniform weight, equal to that of the part to be made, are started with. Such blocks may advantageously be obtained by shearing bars. However, the ratio of the length of the bars to their diameter cannot be below a certain limit.

If, in the part to be made, this ratio is lower, one is led to cut longer blocks out of a bar of smaller cross section, then flatten said blocks in a die, along their axes, in a step preliminary to the shaping step. However, during this flattening step, the blocks tend to crack or split along their edges, which makes them unsuitable for subsequent work.

The invention has for its object to avert this drawback. It is characterized in that the flattening step is performed under such conditions that at least one of the faces of the flattened block is formed with concentric ridges of rounded profile positioned in annular zones adjacent the periphery. The object of these ridges is to prevent the material being worked from running too freely and, surprizingly, this has the effect of preventing edge cracks.

The invention is exemplified in the drawings in which.

Figure 1:
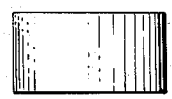
Fig. 1 is an elevation of a disk to be flattened.
Figure 3:
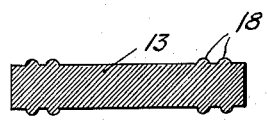
Fig. 3 is a central section through the flattened disk on the line 3—3 of Fig. 4.
Figure 2:
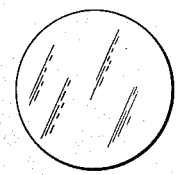
Fig. 2 is a plan thereof.
Figure 4:
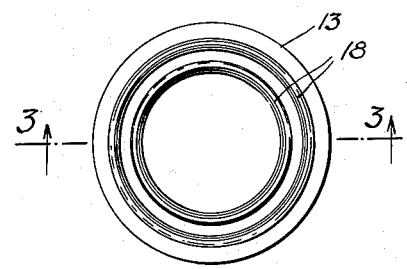
Fig. 4 is the corresponding plan.

In the initial unflattened disk of Figs. 1 and 2, the relation between the thickness and the section is about at the lower limit which it is possible to obtain satisfactorily by shearing disks from a bar. Figs. 3 and 4 show that the part or blank 13 to be manufactured therefrom is considerably thinner and of larger diameter.

Figure 5:
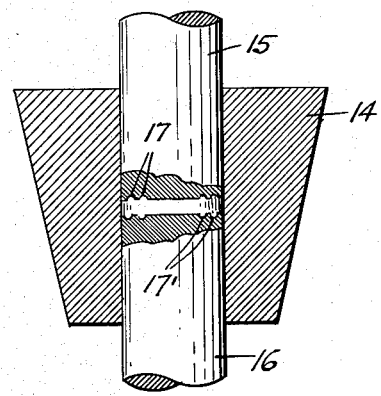
Fig. 5 is an axial section through the stamping die and its punches.

The flattening operation is effected in a die, as shown at 14 in Fig. 5, of which the main punch 15 and the extractor punch 16 present, on their faces, and in zones adjacent their peripheries, a series of concentric scores or grooves 17, 17' of rounded profile and small in depth, over which the disk will spread out in the case of the flattening operation. These produce in the disk 13 the rounded ridges 18.

It may be sufficient to produce such ridges on one side only and correspondingly to provide either the punch 15 or the extractor punch 16 with the scores or grooves 17 or 17'.

Figure 6:
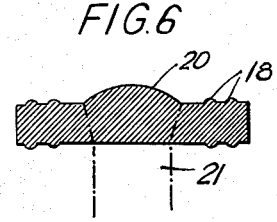
Figs. 6 and 7 show, in central sectional elevation, modifications of the form given the disk.
Figure 7:
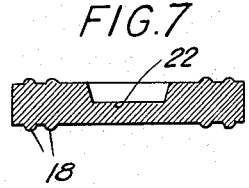

In the case of the manufacture of washers or rings, it is possible to obtain two such parts from a single initial disk. For this purpose the disk is flattened, as in the case of the disk of Figs. 6 and 7, but leaving in its central portion a greater or less thickness, depending on the weight which the second washer is to have. Fig. 6 shows a thick dome-shaped central portion 20 from which a second block may be obtained by punching as indicated by the broken lines 21. Fig. 7 shows a thinner central portion 22 which may be similarly punched out. In either case there are obtained, from the outer annulus a blank for a first ring or washer, and from the central portion removed in producing the same a block 20 or 22 which can thereafter be flattened again, if desired, to form another disk or washer.

The invention is not to be taken as limited to the details of the specific embodiments above described but is to be construed in accordance with the appended claims.

What I claim is:

1. The method of cold-forming a cylindrical disc cut from bar stock to decrease its thickness and increase its diameter within the confines of a circular die without producing edge cracks in the resulting blank comprising the steps of subjecting the disc to axial pressure to cause it to flow radially outwardly toward the wall of said die, and causing the outwardly flowing material to the disc to flow into at least one annular ridge in a zone spaced from the periphery of the flattened disc.

2. The method of claim 1 wherein the material is flowed into ridges on both sides of the flattened disc.

3. The method of claim 1 wherein said ridge is of rounded profile and small depth relative to the thickness of the flattened disc.

4. The method of claim 1 wherein the material is flowed into a plurality of concentric ridges on one side of the flattened disc.

References Cited in the file of this patent

UNITED STATES PATENTS

| 121,474 | Thieny | Dec. 5, 1871 |
| 1,082,910 | Rockwell | Dec. 30, 1913 |
| 2,057,669 | Brauchler | Oct. 20, 1936 |
| 2,360,354 | Lyon | Oct. 17, 1944 |
| 2,644,352 | Ressegger | July 7, 1953 |